United States Patent
Miao et al.

(10) Patent No.: US 12,067,647 B2
(45) Date of Patent: Aug. 20, 2024

(54) VEHICLE REARVIEW DISPLAY WHEN REAR GATE OPENED

(71) Applicant: GM GLOBAL TECHNOLOGY OPERATIONS LLC, Detroit, MI (US)

(72) Inventors: Yun Qian Miao, Waterloo (CA); Norman J Weigert, Whitby (CA); Ralph David Schlottke, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 17/814,160

(22) Filed: Jul. 21, 2022

(65) Prior Publication Data

US 2024/0029318 A1    Jan. 25, 2024

(51) Int. Cl.
| | |
|---|---|
| *G06T 11/00* | (2006.01) |
| *B60R 1/22* | (2022.01) |
| *G01S 13/931* | (2020.01) |
| *G01S 15/931* | (2020.01) |
| *H04N 23/54* | (2023.01) |
| *B60R 11/00* | (2006.01) |
| *B60R 11/04* | (2006.01) |

(52) U.S. Cl.
CPC .............. *G06T 11/00* (2013.01); *B60R 1/22* (2022.01); *G01S 13/931* (2013.01); *G01S 15/931* (2013.01); *H04N 23/54* (2023.01); *B60R 2011/004* (2013.01); *B60R 11/04* (2013.01); *B60R 2300/305* (2013.01); *B60R 2300/806* (2013.01); *G01S 2013/9317* (2013.01); *G01S 2013/93275* (2020.01); *G01S 2015/938* (2013.01); *G06T 2200/24* (2013.01)

(58) Field of Classification Search
CPC ....... G06T 11/00; G06T 2200/24; B60R 1/22; B60R 11/04; B60R 2300/305; B60R 2300/806; H04N 23/54; G01S 13/931; G01S 15/931; G01S 2013/93275; G01S 2013/9317; G01S 2015/938
USPC .......................................................... 345/633
See application file for complete search history.

(56) References Cited

U.S. PATENT DOCUMENTS

| | | | |
|---|---|---|---|
| 2003/0052969 A1 | 3/2003 | Satoh et al. | |
| 2018/0134315 A1* | 5/2018 | Marczok | B62D 15/0275 |
| 2019/0311523 A1* | 10/2019 | Milz | G06T 3/005 |
| 2019/0366929 A1 | 12/2019 | Maruoka et al. | |
| 2020/0118310 A1* | 4/2020 | Matsumoto | B62D 15/0295 |
| 2020/0406860 A1* | 12/2020 | Mai | B60R 25/31 |
| 2022/0176876 A1* | 6/2022 | Whitehouse | G08G 1/168 |

(Continued)

FOREIGN PATENT DOCUMENTS

DE    102013216826 A1    2/2015

*Primary Examiner* — Jin Ge
(74) *Attorney, Agent, or Firm* — Lorenz & Kopf LLP (57) ABSTRACT

Vehicles and methods for augmenting rearview displays for vehicles are provided. An exemplary method is provided for augmenting a rearview display for a vehicle having a gate moveable between a closed configuration and an opened configuration. The method includes collecting dynamic pixel images of an area behind the vehicle using a camera connected to the vehicle. Further, the method includes, in response to a command, displaying graphical overlays to the collected dynamic pixel images on a display screen, via a processor, wherein the graphical overlays depict an outline of the gate and/or projected path of the gate in the opened configuration.

18 Claims, 5 Drawing Sheets

(56) References Cited

U.S. PATENT DOCUMENTS

2023/0038913 A1* 2/2023 Higuma ................ B60K 35/00
2023/0236312 A1* 7/2023 Salter ..................... B60R 13/04
                                                      342/118

* cited by examiner

VEHICLE REARVIEW DISPLAY WHEN REAR GATE OPENED

INTRODUCTION

The technical field generally relates to the field of vehicles and, more specifically, to methods and systems for displaying a rearview image from a rear vision camera in a vehicle.

Many vehicles include a rear vision camera that provides a view for a region behind the vehicle. However, in certain circumstances the rearview camera may be part of a system that does not always provide optimal images in certain situations.

For example, for pickup trucks, sport utility vehicles (SUVs), hatchbacks, and other vehicles, the rear vision camera may be mounted to a rear gate, such as a tailgate or liftgate, that moves between closed and opened configurations. Thus, the dynamics of the camera location and orientation and of the moving vehicle may be changed.

Accordingly, it is desirable to provide a method for providing an augmented rearview display that communicates an appropriate view according to the present configuration or potential configuration of the vehicle. Furthermore, other desirable features and characteristics will become apparent from the subsequent detailed description and the appended claims, taken in conjunction with the accompanying drawings and the foregoing technical field and background.

SUMMARY

Methods for augmenting rearview displays for vehicles, vehicles with augmented rearview displays, and non-transitory and machine-readable medium having stored thereon executable instructions adapted to augment rearview displays are provided.

A method is provided for augmenting a rearview display for a vehicle having a gate moveable between a closed configuration and an opened configuration. The method includes collecting dynamic pixel images of an area behind the vehicle using a camera connected to the vehicle. Also, the method includes displaying, via a processor, a first graphical overlay to the collected dynamic pixel images on a display screen in response to a command. The first graphical overlay depicts an outline of the gate in the opened configuration.

In exemplary embodiments of the method, the gate is a tailgate and the command is sent to the processor in response to a user-initiated request for the first graphical overlay.

In exemplary embodiments of the method, the gate is a liftgate and the command is sent to the processor in response to a user-initiated request for the first graphical overlay.

In exemplary embodiments of the method, the gate is a tailgate and the command is automatically sent to the processor when the gate is in the opened configuration whose status is detected via ajar sensing and the vehicle is in reverse.

In exemplary embodiments of the method, the gate is a tailgate and the method further includes displaying a second graphical overlay to the collected dynamic pixel images on the display screen, via the processor, wherein the second graphical overlay depicts a projected path of the tailgate.

In exemplary embodiments of the method, the gate is a tailgate; the camera is mounted on the tailgate; the camera has a first perspective when the tailgate is in the closed configuration; the camera has a second perspective when the tailgate is in the opened configuration; when the tailgate is in the closed configuration, the processor generates a projected path of the tailgate based on the first perspective; when the tailgate is in the opened configuration, the processor generates the projected path of the tailgate based on the second perspective; and the method further includes displaying a second graphical overlay to the collected dynamic pixel images on the display screen, via the processor, wherein the second graphical overlay depicts the projected path of the tailgate.

In exemplary embodiments of the method, the command is a rear bumper object detect signal sent to the processor in response to detection of an object by a sensor. In certain embodiments, the sensor is an ultrasonic sensor (USS) or a short-range radar (SRR) device.

In another embodiment, a vehicle is provided with an augmented rearview display. The vehicle includes a gate moveable between a closed configuration and an opened configuration; a camera connected to the vehicle and configured to collect dynamic pixel images of an area behind the vehicle; a display screen configured to display the collected dynamic pixel images; and memory configured to include one or more executable instructions and a processor configured to execute executable instructions, wherein the executable instructions enable the processor to display a first graphical overlay to the collected dynamic pixel images on the display screen, wherein the first graphical overlay depicts an outline of the gate in the opened configuration.

In exemplary embodiments, the executable instructions enable the processor to generate a projected path of the gate and to display a second graphical overlay to the collected dynamic pixel images on the display screen, wherein the second graphical overlay depicts the projected path of the gate.

In exemplary embodiments of the vehicle, the gate is a tailgate.

In exemplary embodiments of the vehicle, the gate is a liftgate.

In exemplary embodiments of the vehicle, the camera is mounted to the gate.

In exemplary embodiments, the vehicle includes an input for receiving a user-initiated request for the first graphical overlay.

In exemplary embodiments, the vehicle includes a sensor configured to determine whether the vehicle is in reverse.

In exemplary embodiments, the vehicle includes a gate sensor configured to determine whether the gate is in the closed configuration or the opened configuration.

In exemplary embodiments, the vehicle includes a sensor configured to detect an object in the area behind the vehicle. In certain embodiments, the sensor is an ultrasonic sensor (USS) or a short-range radar (SRR) device.

Another embodiment includes a non-transitory and machine-readable medium having stored thereon executable instructions adapted to augment a rearview display. When the executable instructions are provided to a processor and executed thereby, the processor is caused to display a first graphical overlay to collected dynamic pixel images on a display screen. The first graphical overlay depicts an outline of a gate in an opened configuration.

In exemplary embodiments, the executable instructions, when provided to the processor and executed thereby, cause the processor to generate a projected path of the gate and to display a second graphical overlay to the collected dynamic pixel images on the display screen, wherein the second graphical overlay depicts the projected path of the gate.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

As used herein, "in reverse" means that the vehicle is in reverse gear, for geared vehicles, or is in reverse mode for traveling in the reverse direction, or is moving in the reverse direction.

Figure 1:
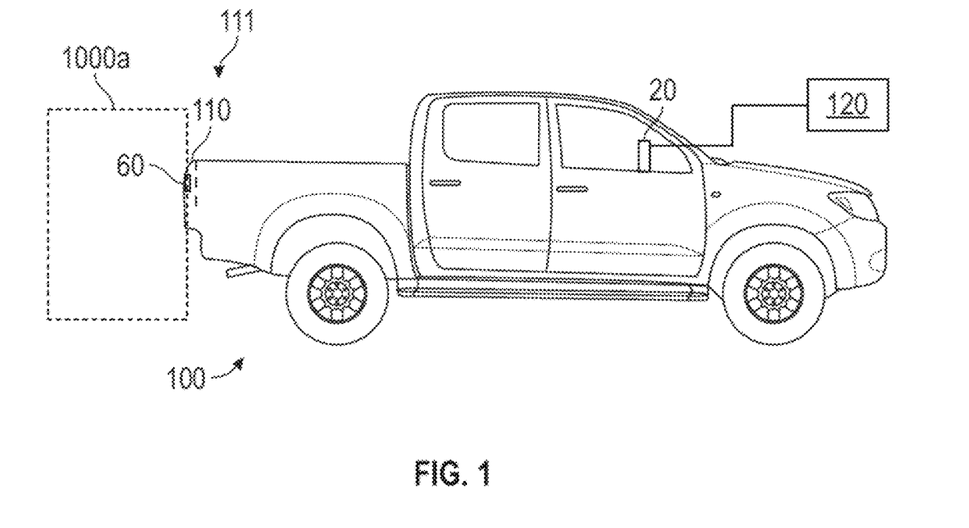
FIG. 1 is a schematic side view of a vehicle having a gate in a closed configuration in accordance with an embodiment.
Figure 2:
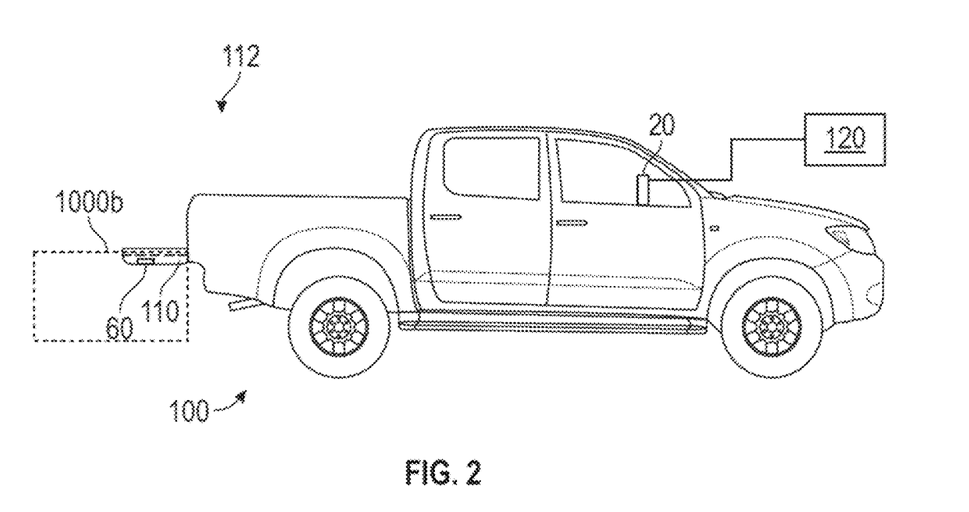
FIG. 2 is a schematic side view of the vehicle of FIG. 1 having a gate in an opened configuration in accordance with an embodiment.
Figure 3:
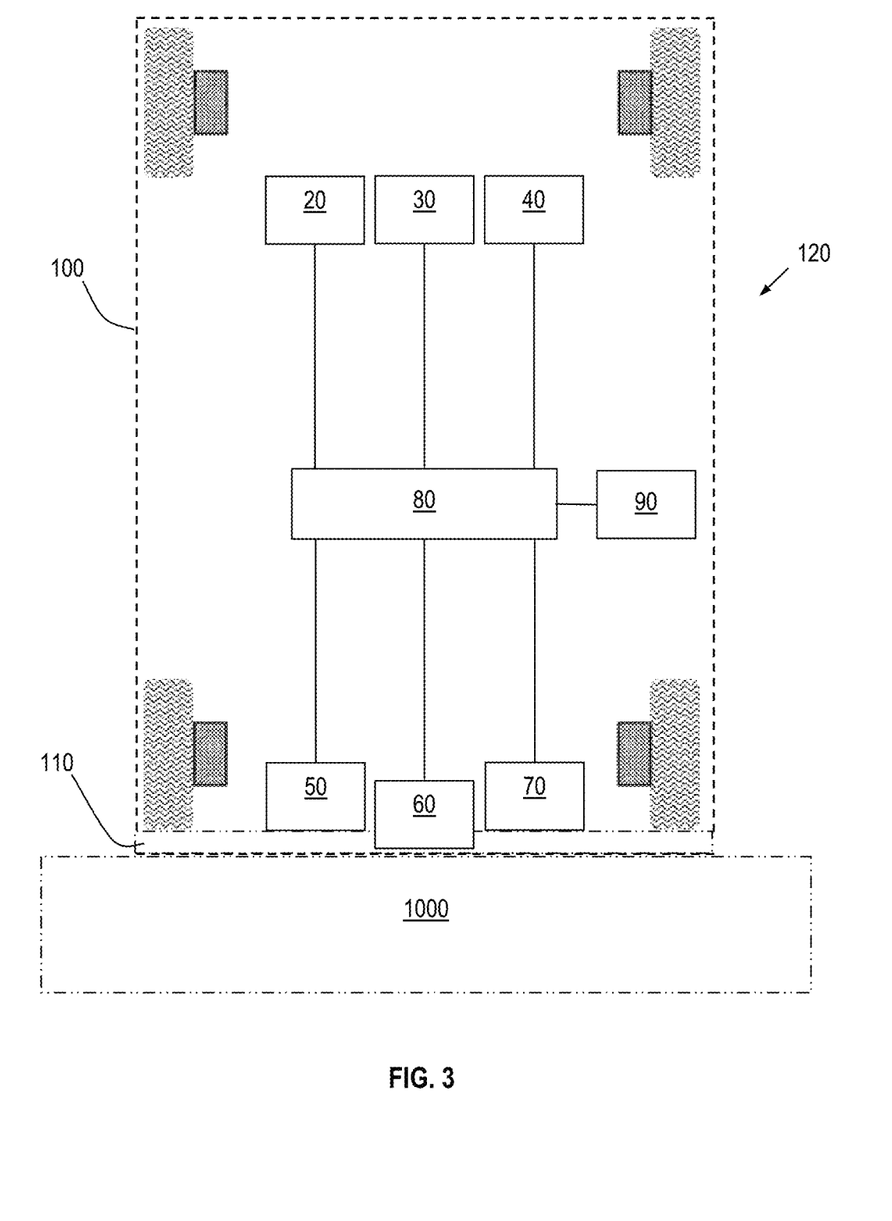
FIG. 3 is a functional block diagram of the vehicle of FIGS. 1-2 in accordance with an embodiment.

Referring to FIGS. 1-3, an exemplary vehicle 100 is illustrated in accordance with various embodiments. In FIG. 1, the vehicle 100 includes a gate 110, such as a rear gate, in a closed configuration 111. The illustrated gate 110 is a tailgate that opens about a lower hinge, though in certain embodiments the gate 110 may be a liftgate that opens about an upper hinge or other hinge arrangement.

As shown, the vehicle 100 includes a rearview camera 60 mounted to the gate 110. The camera 60 is configured to collect dynamic pixel images of an area 1000 behind the vehicle 100.

The vehicle 100 further includes a computer system 120 associated with a display screen 20 for displaying the collected dynamic pixel images of the area 1000a behind the vehicle 100 in accordance with various embodiments. For example, when the gate 110 is closed, a user may wish to see whether there is clearance behind the vehicle 100 for opening the gate 110. The computer system 120 is configured to generate the dynamic pixel images with a graphical overlay and to display images to the user. An exemplary graphical overlay includes an outline of the gate 110 in the opened configuration. An exemplary graphical overlay may further include a semi-transparent projection of the upper surface of the gate 110 when in the opened configuration. Accordingly, the user is provided with a rearview display that indicates whether the gate 110 may be opened without contacting any object in the area behind the vehicle 100.

FIG. 2 illustrates the vehicle 100 with the gate 110 in the opened configuration 112. As shown, the location and pitch angle or perspective of the camera 60 relative to the rest of the vehicle 100 is changed when the gate 110 in moved to the opened configuration 112. As shown, when the perspective of the camera 60 is changed, the area 1000a changes to the area 1000b. In accordance with various embodiments, when the gate 110 is opened and the vehicle 100 is in reverse, the computer system 120 is configured to generate the dynamic pixel images with a graphical overlay and display the augmented images to the user. An exemplary graphical overlay includes an outline of the gate 110 in the opened configuration. An exemplary graphical overlay may further include a semi-transparent projection of the gate 110 in the opened configuration. Accordingly, the user is provided with a rearview display that indicates the projected path of the opened gate for traffic or object avoidance. The overlayed tailgate/liftgate's position and size are calibratable with the known vehicle model data. The projected path of the opened gate is calibratable with vehicle kinematics calculated from the known vehicle model data and vehicle motion signals, e.g., speed and steering wheel angles.

FIG. 3 illustrates the computer system 120 and other internal components of the vehicle 100 in accordance with various embodiments. As shown, in addition to the gate 110, the rearview camera 60, and the rearview display screen 20, the exemplary vehicle 100 includes a user interface 30, a vehicle dynamics sensor system 40, a gate configuration sensor 50, an object sensor 70, a processor 80 and a memory 90.

As shown, the rearview display screen 20, the user interface 30, the vehicle dynamic sensor system 40, the gate configuration sensor 50, the rearview camera 60, the object sensor 70, and the memory 90 are interconnected with the processor 80, and are interconnected with each other through the processor 80.

An exemplary rearview display screen 20 is configured to display the collected dynamic pixel images and may be arranged within a cabin or other interior portion of the vehicle 100 for viewing by an occupant of the vehicle 100.

In exemplary embodiments, the user interface 30 is or includes an input for receiving a user-initiated request. Further, in exemplary embodiments, the user interface 30 may be provided in combination with the rearview display screen 20. For example, the rearview display screen 20 may include a touch screen including one or more pressure sensors configured as a user interface 30 to receive an input or command from a user. In certain embodiments, a swipe or other motion on the touch screen may be used to communicate a request or command from the user to the vehicle 100 or system.

An exemplary vehicle dynamics sensor system 40 includes a range or motion sensor and is configured to determine whether the vehicle 100 is operating in reverse or is moving in the reverse direction. Further, an exemplary vehicle dynamics sensor system 40 includes sensors configured to determine a steering angle of a steering wheel of the vehicle 100, a speed of the vehicle 100, a rate of acceleration of the vehicle 100, and/or other vehicle dynamics.

An exemplary gate configuration sensor 50 is configured to determine whether the gate is in the closed configuration 111 (FIG. 1) or the opened configuration 112 (FIG. 2).

An exemplary camera 60 is connected to the vehicle 100 and is configured to collect dynamic pixel images of the area 1000*a*, 1000*b* behind the vehicle 100.

An exemplary object sensor 70 is configured to detect an object in the area 1000*a*, 1000*b* behind the vehicle 100. An exemplary object sensor 70 is mounted to the vehicle 100 such as on or in the rear bumper below the gate 110. An exemplary object sensor 70 is an ultrasonic sensor (USS) or a short-range radar (SRR) device.

An exemplary memory 90 is configured to comprise one or more executable instructions and an exemplary processor 80 is configured to execute the executable instructions. In exemplary embodiments, the executable instructions enable the processor 80 to display a first graphical overlay to the collected dynamic pixel images on the display screen 20, where the first graphical overlay depicts an outline of the gate 110 in the opened configuration 112. Further, in exemplary embodiments, the executable instructions enable the processor 80 to generate a projected path of the tailgate and to display a second graphical overlay to the collected dynamic pixel images on the display screen 20, where the second graphical overlay depicts the projected path of the tailgate 110.

Figure 4:
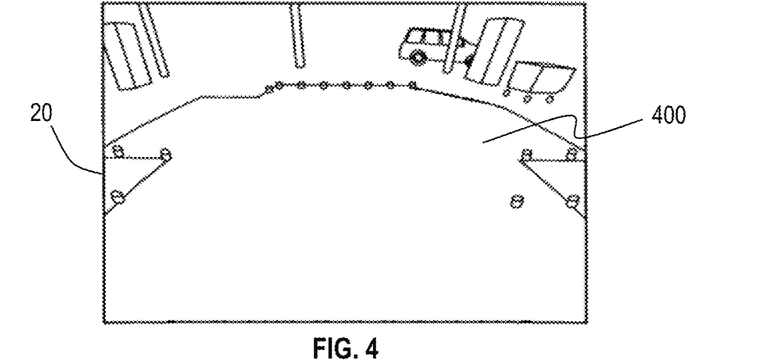
FIGS. 4-6 provide display images for a vehicle, illustrating how graphical overlays are provided in accordance with embodiments.
Figure 5:
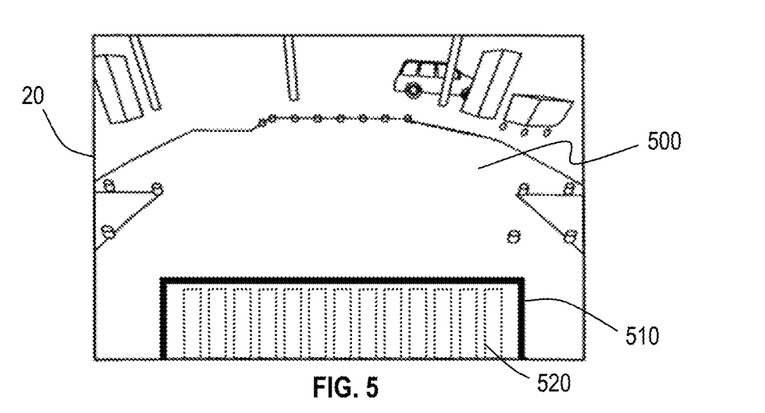
Figure 6:
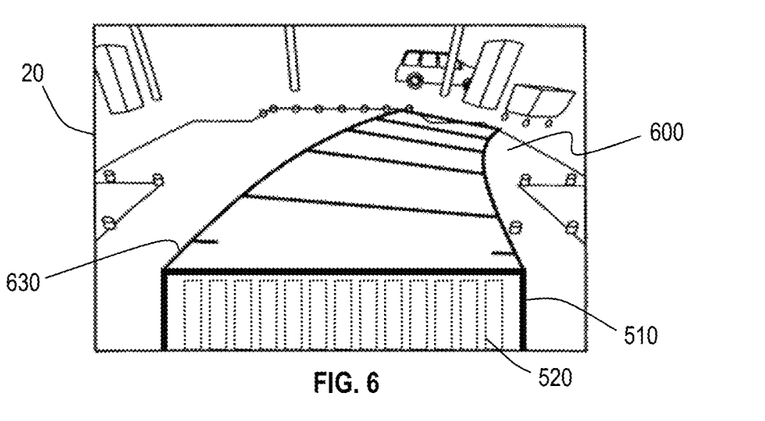

Referring now to FIGS. 4-6 and with continued reference to FIGS. 1-3, the display of images and graphical overlays on display screen 20 as performed by the computer system 120 of FIGS. 1-3 is described in accordance with various embodiments. FIGS. 4-6 illustrate the display screen 20 of the vehicle 100 of FIGS. 1-3 while displaying the augmented dynamic pixel images collected by the camera 60.

Specifically, FIG. 4 illustrates the display screen 20 of the vehicle 100 of FIGS. 1-3 while displaying an image 400 including only dynamic pixel images collected by the camera 60. In FIG. 4, the gate 110 on which the camera 60 is mounted is in the opened configuration. In order to provide the image 400 of FIG. 4, the processor 80 receives an input or inputs indicating that the gate 110 is in the opened configuration, such as from the gate configuration sensor 50. Further, the processor 80 receives collected dynamic pixel images from the camera 60. Also, the processor 80 may receive, from the memory 90, the known location and pitch angle or perspective of the camera 60 when the gate is in the opened configuration 112. In exemplary embodiments, the processor 80 crops the collected dynamic pixel images to create the cropped rearview image 400 on the display screen 20 based on the received inputs as shown in FIG. 4.

FIG. 5 further illustrates the display screen 20 of the vehicle 100 of FIGS. 1-3 while displaying an image 500 including dynamic pixel images collected by the camera 60, a graphical overlay 510, and graphical overlay 520. In addition to the processing described above in relation to FIG. 4, the processor 80 receives a display command, such as from the user interface 30, from the vehicle dynamic sensor system 40 and the gate configuration sensor 50, e.g., an automatic command activated when the gate is opened and the vehicle is in reverse, or from the object sensor 70, such as when an object is sensed to be approaching the rear of the vehicle. When such a command is received, the processor 80 displays the graphical overlay 510 over the collected dynamic pixel images in the form of the cropped image 500 on the display screen 20. In exemplary embodiments, the graphical overlay depicts an outline of the gate in the opened configuration. Such an outline may be saved in the memory 90.

Further, when the processor 80 receives the display command, the processor 80 may display the graphical overlay 520 over the collected dynamic pixel images in the form of the cropped image 500 on the display screen 20. In exemplary embodiments, the graphical overlay 520 is a semi-transparent projection of the upper surface of the gate in the opened configuration. Such a projection of the upper surface of the gate may be saved in the memory 90.

As shown in FIG. 5, graphical overlay 520 is bounded by graphical overlay 510.

FIG. 6 illustrates a further embodiment in which the display screen 20 of the vehicle 100 of FIGS. 1-3 displays an image 600 including dynamic pixel images collected by the camera 60, graphical overlay 510, graphical overlay 520, and a graphical overlay 630. In addition to the processing described above in relation to FIG. 5, the processor 80 receives vehicle dynamic information from the vehicle dynamic sensor system 40, indicating the direction of vehicle motion, as well as speed, acceleration, steering angle, and other vehicle dynamics in certain embodiments. The processor 80 generates or revises guidelines based on the known orientation and location of the camera in the gate-opened configuration and on vehicle dynamics. The guidelines border a projected path of the gate. When an appropriate command is received, the processor 80 displays graphical overlay 630, which is or includes the guidelines bordering the projected path of the gate. In certain embodiments, a command to display graphical overlay 630 may be automatically activated when the vehicle is determined to be in reverse and the gate is determined to be in the opened configuration.

While FIGS. 4-6 are described in the context of the gate 110 being in the opened configuration, it is noted that embodiments herein provide for displaying the graphical overlay 510 over the collected dynamic pixel images from a camera, as illustrated in FIG. 5, when the gate is in the closed configuration. In such embodiments, the image 500 of FIG. 5 is not cropped based on the opened configuration of the gate. Rather, when an appropriate display command is received, such as from a user input or triggered from object detection sensors, the processor displays the graphical overlay 510 over the image 500 including dynamic pixel images collected by the camera 60 in the closed gate configuration without cropping based on camera location and pitch angle or perspective based on the opened gate configuration.

Figure 7:
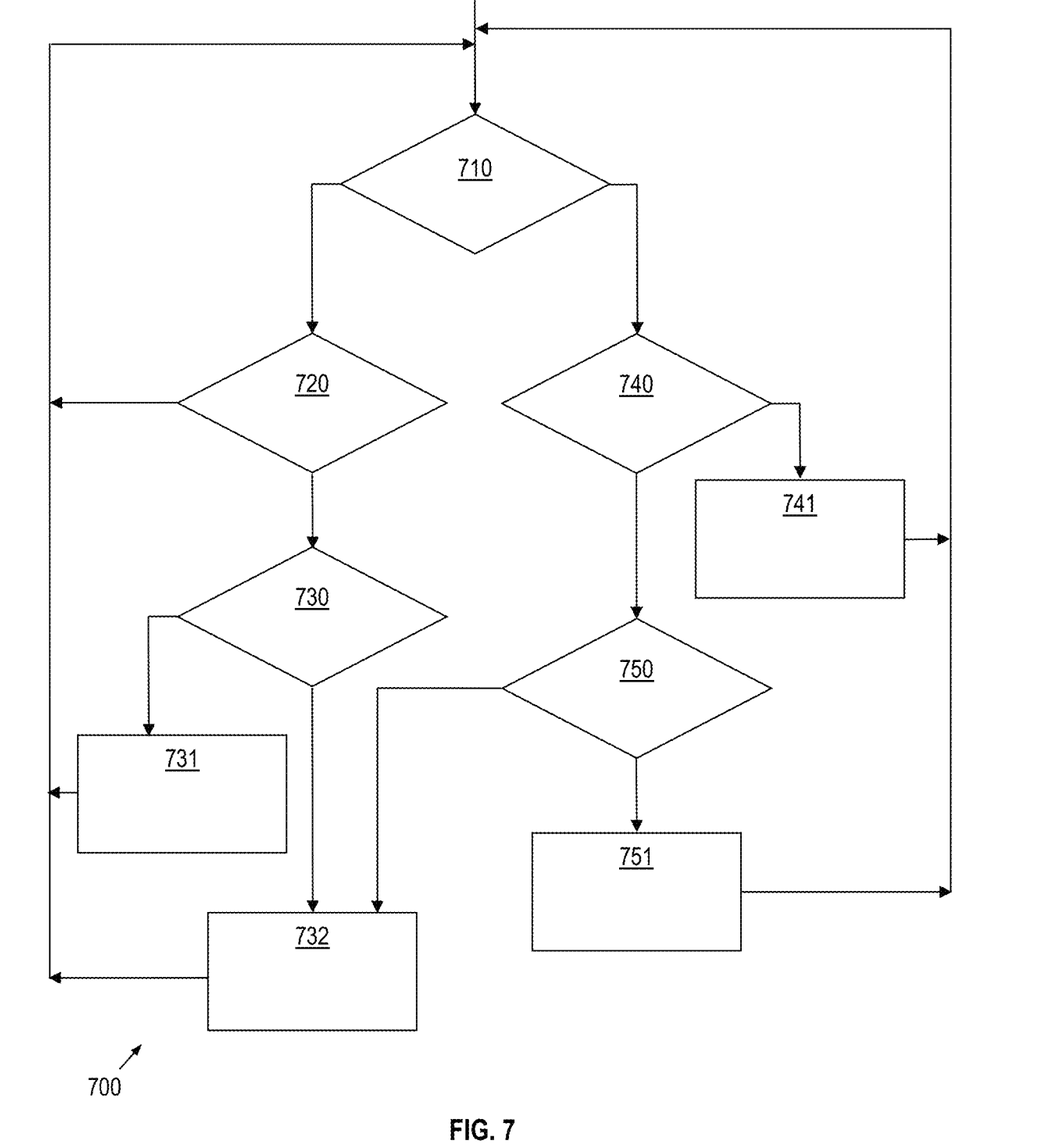
FIG. 7 is a flowchart of a process for providing graphical overlays in a rearview display.

Referring now to FIG. 7, a flowchart of an exemplary process 700 for providing graphical overlays 510, 520, and/or 630 on a rearview display screen 200 is illustrated. As shown, the process 700 includes determining whether the vehicle is in reverse at query 710. In certain embodiments, such a determination may be made by the processor 80 based on inputs from vehicle dynamic sensor system 40 and/or from the object sensor 70.

When query 710 determines that the vehicle is not in reverse, the process 700 may continue at query 720 with determining whether a user-initiated display command has been received. In certain embodiments, such a display command is inputted by a user at the user interface 30.

When query 720 determines that no user-initiated display command has been received, process 700 reverts to query 710 as shown.

When query 720 determines that a user-initiated display command has been received, then process 700 continues at query 730 with determining whether the gate is in the opened configuration. Specifically, the processor 80 may determine whether a signal is received from the gate configuration sensor 50 indicating that the gate is in the opened or closed configuration.

When query 730 determines that the gate is in the opened configuration, then process 730 may continue with action 731 in which the processor displays on the display screen 20 the image 500, including a cropped image of the collected pixel images and the graphical overlay 510 and optionally the graphical overlay 520, similar to FIG. 5.

When query 730 determines that the gate is not in the opened configuration, i.e., when query 730 determines that the gate is in the closed configuration, then process 730 may continue with action 732 in which the processor displays on the display screen 20 the collected pixel images with the graphical overlay 510 and, optionally, the graphical overlay 520. No cropping based on the changed location and the pitch angle or perspective of the camera is needed.

In typical use, actions 731 or 732 may be indicated to display images with graphical overlays 510 and 520 when the vehicle is in park or otherwise not moving and the user has inputted the user-initiated display command.

When query 710 determines that the vehicle is in reverse, the process 700 may continue at query 740 with determining whether an automatic display command has been received. An automatic display command is generated when the vehicle is in reverse and the tailgate is in the opened configuration.

When query 740 determines that no automatic display command has been received, then process 700 continues with query 750, where the process 700 determines whether a user-initiated display command has been received. In certain embodiments, such a display command is inputted by a user at the user interface 30.

When query 750 determines that no user-initiated display command has been received, process 700 continues at action 751 where the processor 80 displays on the display screen 20 an image including the collected pixel images. The processor may display a graphical overlay, which is or includes guidelines bordering the projected path of the vehicle, i.e., with the gate in the closed configuration.

When query 750 determines that a user-initiated display command has been received, process 700 continues at action 732 in which the processor displays on the display screen 20 the collected pixel images with the graphical overlay 510 and, optionally, the graphical overlay 520. No cropping based on the changed location and the pitch angle or perspective of the camera is needed.

When query 740 determines that an automatic display command has been received, then process 700 continues with action 741 in which the processor displays on the display screen 20 the image 600, including a cropped image of the collected pixel images, the graphical overlay 510, optionally the graphical overlay 520, and the graphical overlay 630, similar to FIG. 6.

While FIG. 7 describes a process for operation, such process is but one possibility and is only provided for demonstrative purposes.

Figure 8:
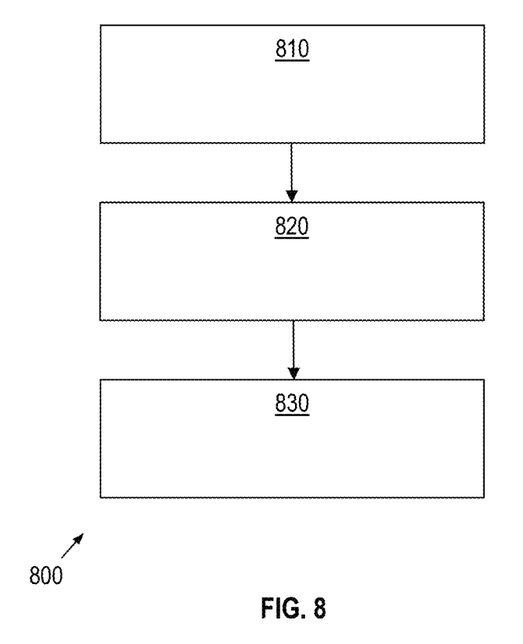
FIG. 8 is a flowchart of a method for augmenting a rearview display for a vehicle having a gate moveable between a closed configuration and an opened configuration in accordance with an embodiment.

Referring now to FIG. 8, a process 800 for augmenting a rearview display for a vehicle having a gate moveable between a closed configuration and an opened configuration as performed by the computer system 120 of FIGS. 1-3 is illustrated. The process 800 includes, at action 810, collecting dynamic pixel images of an area behind the vehicle using a camera connected to the vehicle.

As shown, the exemplary process 800 includes, at action 820, receiving a display command. The command may be user-initiated or automatically activated under selected conditions.

Further, the process 800 includes, at action 830, displaying a graphical overlay to the collected dynamic pixel images on a display screen in response to the command.

In exemplary embodiments, the graphical overlay includes a first graphical overlay depicting an outline of the gate in the opened configuration. In exemplary embodiments, the graphical overlay includes a second graphical overlay depicting a projected path of the gate.

As disclosed herein, methods provide and vehicles are provided with augmented rearview displays. Such displays may be provided upon user request or automatically in response to certain selected conditions. For example, the augmented rearview display may be displayed in response to a user-initiated command. Alternatively or additionally, the augmented rearview display may be displayed in response to signals indicating that the vehicle is in reverse and the gate is in the opened configuration, or to signals indicating that an object is approaching the rear of the vehicle and the gate is in the opened configuration.

Further, embodiments herein provide for correcting the camera view perspective based on the known location and pitch angle of the camera when the gate is in the opened configuration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for augmenting a rearview display for a vehicle having a gate moveable between a closed configuration and an opened configuration, the method comprising:
  collecting dynamic pixel images of an area behind the vehicle using a camera connected mounted on the gate of the vehicle, wherein the gate is a tailgate or liftgate, wherein the camera has a first perspective when the gate is in the closed configuration; and wherein the camera has a second perspective when the gate is in the opened configuration;

generating, via a processor, a projected path of the gate based on the first perspective when the gate is in the closed configuration;

receiving, via the processor, an input indicating the gate is in the opened configuration from a gate configuration sensor;

receiving, via the processor, a known location and pitch angle of the camera when the gate is in the opened configuration;

cropping, via the processor, the dynamic pixel images based on the known location and pitch angle of the camera to create a cropped image;

generating the projected path of the gate based on the second perspective when the gate is in the opened configuration; and in response to a command, displaying a first graphical overlay to the dynamic pixel images on a display screen, via the processor, when the gate is in the closed configuration, wherein the first graphical overlay depicts an outline of the gate in the opened configuration, and displaying the first graphical overlay to the cropped image on the display screen, via the processor, when the gate is in the opened configuration.

2. The method of claim 1 wherein the gate is a tailgate and the command is sent to the processor in response to a user-initiated request for the first graphical overlay.

3. The method of claim 1 wherein the gate is a liftgate and the command is sent to the processor in response to a user-initiated request for the first graphical overlay.

4. The method of claim 1 wherein the gate is a tailgate and the command is automatically sent to the processor when the gate is in the opened configuration and the vehicle is in reverse.

5. The method of claim 1 wherein the gate is a tailgate and wherein the method further comprises displaying a second graphical overlay to the dynamic pixel images on the display screen, via the processor, when the gate is in the closed configuration, wherein the second graphical overlay depicts a projected path of the tailgate.

6. The method of claim 5 wherein the method further comprises displaying the second graphical overlay to the cropped image on the display screen, via the processor, when the gate is in the opened configuration.

7. The method of claim 1 wherein the command is a rear bumper object detect signal sent to the processor in response to detection of an object by a sensor.

8. The method of claim 7 wherein the sensor is an ultrasonic sensor (USS) or a short-range radar (SRR) device.

9. A vehicle having an augmented rearview display, the vehicle comprising:

a gate moveable between a closed configuration and an opened configuration, wherein the gate is a tailgate or liftgate;

a camera mounted to the gate of the vehicle and configured to collect dynamic pixel images of an area behind the vehicle, wherein the camera has a first perspective when the gate is in the closed configuration; and wherein the camera has a second perspective when the gate is in the opened configuration;

a display screen; and memory configured to comprise one or more executable instructions and a processor configured to execute executable instructions, wherein the executable instructions enable the processor to:

generate a projected path of the gate based on the first perspective when the gate is in the closed configuration;

receive an input indicating the gate is in the opened configuration from a gate configuration sensor;

receive a known location and pitch angle of the camera when the gate is in the opened configuration;

crop the dynamic pixel images based on the known location and pitch angle of the camera to create a cropped image;

generate the projected path of the gate based on the second perspective when the gate is in the opened configuration;

display a first graphical overlay to the dynamic pixel images on the display screen when the gate is in the closed configuration, wherein the first graphical overlay depicts an outline of the gate in the opened configuration; and display the first graphical overlay to the cropped image on the display screen when the gate is in the opened configuration.

10. The vehicle of claim 9, wherein the executable instructions enable the processor to generate a projected path of the gate and to display a second graphical overlay to the dynamic pixel images on the display screen when the gate is in the closed configuration, wherein the second graphical overlay depicts the projected path of the gate, and to display the second graphical overlay to the cropped image on the display screen when the gate is in the opened configuration.

11. The vehicle of claim 9, wherein the gate is a tailgate.

12. The vehicle of claim 9, wherein the gate is a liftgate.

13. The vehicle of claim 9, further comprising an input for receiving a user-initiated request for the first graphical overlay.

14. The vehicle of claim 9, further comprising a sensor configured to determine whether the vehicle is in reverse.

15. The vehicle of claim 9, further comprising a sensor configured to detect an object in the area behind the vehicle.

16. The vehicle of claim 15, wherein the sensor is an ultrasonic sensor (USS) or a short-range radar (SRR) device.

17. A non-transitory and machine-readable medium having stored thereon executable instructions adapted to augment a rearview display for a vehicle having a rear gate, which when provided to a processor and executed thereby, causes the processor to:

receive dynamic pixel images of an area behind the vehicle collected by a camera;

generate a projected path of the rear gate based on a first perspective when the rear gate is in a closed configuration;

generate the projected path of the rear gate based on a second perspective when the rear gate is in an opened configuration;

crop the dynamic pixel images based on a known location and pitch angle of the camera to create a cropped image when the rear gate is in the opened configuration;

display a first graphical overlay to the dynamic pixel images on a display screen when the rear gate is in the closed configuration, wherein the first graphical overlay depicts an outline of the rear gate in the opened configuration; and display the first graphical overlay to the cropped image on the display screen when the rear gate is in the opened configuration.

18. The non-transitory and machine-readable medium of claim 17, wherein the executable instructions, when provided to the processor and executed thereby, cause the processor to generate a projected path of the rear gate and to display a second graphical overlay to the dynamic pixel images on the display screen when the rear gate is in the closed configuration, wherein the second graphical overlay depicts the projected path of the rear gate, and to display the second graphical overlay to the cropped image on the display screen when the rear gate is in the opened configuration.

\* \* \* \* \*